US005225868A

United States Patent [19]

Maruta

[11] Patent Number: 5,225,868

[45] Date of Patent: Jul. 6, 1993

[54] IMAGE FORMING APPARATUS

[75] Inventor: Syuzi Maruta, Toyokawa, Japan

[73] Assignee: Minolta Camera Kabushiki Kaisha, Osaka, Japan

[21] Appl. No.: 882,303

[22] Filed: May 13, 1992

[30] Foreign Application Priority Data

May 15, 1991 [JP] Japan ........................ 3-110262

[51] Int. Cl.[5] ........ G03B 27/48; G03B 27/50; G03B 27/70

[52] U.S. Cl. ........................ 355/50

[58] Field of Search ........ 355/50, 316, 317, 321, 355/308, 23, 24, 320, 205, 207 291/3.1, 259, 4, 5, 31, 35, 38, 98-99, 165, 265

[56] References Cited

U.S. PATENT DOCUMENTS 3,728,020 4/1973 Abrams et al. ........ 355/66
5,078,379 1/1992 Leisner ........ 271/3.1

FOREIGN PATENT DOCUMENTS 55-53356 4/1980 Japan .

*Primary Examiner*—Richard A. Wintercorn

*Attorney, Agent, or Firm*—Willian Brinks Olds Hofer Gilson & Lione

[57] ABSTRACT

An image forming apparatus having a document transporting mechanism which transports documents one by one from a document feed tray, to the exposure location on a platen and which prefeeds the next document to a position before the platen, and a control mechanism which in response to an instruction of stopping the image form operation controls the operation of the document transporting mechanism so as to transport a document prefed to the position before the platen, in a predetermined direction. When a trouble occurs in the main body of the image forming apparatus during the image forming operation and the stop instruction is issued, a document on the platen is immediately transported to a document discharge tray, and also a document which has been prefed to the position before the platen is transported to a predetermined position (onto the platen, the document discharge tray or the document feed tray). The prefed document is not left stand in a loop state for a long period of time, thereby preventing a document from having a tendency to curl and a document jam from occurring.

11 Claims, 11 Drawing Sheets

IMAGE FORMING APPARATUS

BACKGROUND OF THE INVENTION

1. Field of the Invention

This invention relates to an image forming apparatus having a document feeder which transports a document while prefeeding the next document.

2. Description of the Related Art

An automatic document feeder generally consists of a document feeding unit which feeds documents on a document feed tray one by one, a document transporting unit having a conveyor belt which transports a document fed from the document feeding unit to a predetermined exposure location on a platen glass, and a document discharging unit which discharges a document transported from the document transporting unit onto a document discharge tray. A known document feeding unit comprises a feeding roller which feed a document on the tray, and a resist unit which stops a fed document to correct the skew of the document.

In such an automatic document feeder, when a copy operation is started, a document which has been fed out from the document feed tray is temporarily stopped at the resist unit, and then transported to the predetermined exposure location on the platen glass. On the other hand, during when this document (previous document) is transported onto the platen glass, the next document is fed to the resist unit and is stopped while being formed into a loop. Then, the control is performed so that the next document is transported onto the platen glass at the same time when the copy operation of the previous document is finished and the previous document is discharged to the document discharging unit. When a trouble such as a jam arises in the main body of the copying apparatus during an operation of copying a plurality of documents, both the drive operations of the main body and the automatic document feeder are simultaneously stopped, and the documents respectively placed at the exposure location and the resist unit are kept not to be discharged until this trouble is settled.

In a case that a trouble such as a jam has once occurred as described above, if it takes a long period of time to settle the trouble, the next document which has been prefed remains to stand for the long period of time while being formed into a loop. As a result, the document is put into the state in which it naturally curls. If the document is transported as it is, a jam occurs, causing problems in that the normal document transportation is disabled and that the document is damaged.

SUMMARY OF THE INVENTION

It is an object of the invention to provide an image forming apparatus in which, when a trouble happens in the main body of the image forming apparatus, a prefed document is not allowed to unnecessarily remain to stand for a long period of time while being formed into a loop.

It is another object of the invention to provide an image forming apparatus in which a document is not caused to have a tendency to curl.

It is a further object of the invention to provide an image forming apparatus which can prevent a transportation error caused by transporting a document having a tendency to curl, from occurring.

An image forming apparatus according to the invention comprises document transporting means for transporting documents one by one from a document feed tray to an exposure location on a platen, and for prefeeding the next document at a position before the platen, instruction means for instructing the stop of the image forming operation, and control means for, in response to the stop instruction from the instruction means, controlling the document transporting means so as to transport in a predetermined direction a document which has been prefed to the position before the platen.

In a case of copying a plurality of documents, when a trouble occurs in the main body of the copying apparatus during the copy operation and the instruction of stopping the copy operation is issued, a document on the platen is immediately transported to the document discharge tray, and also a document which has been prefed to the position before the platen is transported to a predetermined position. More specifically, this prefed document is immediately transported onto the platen, or to the document discharge tray or the document feed tray. Therefore, the prefed document is prevented from having a tendency to curl, and also a document jam is prevented from occurring.

The above and further objects and features of the invention will more fully be apparent from the following detailed description with accompanying drawings.

DESCRIPTION OF THE PREFERRED EMBODIMENTS

The invention will be described with reference to the drawings illustrating its embodiments.

Figure 1:
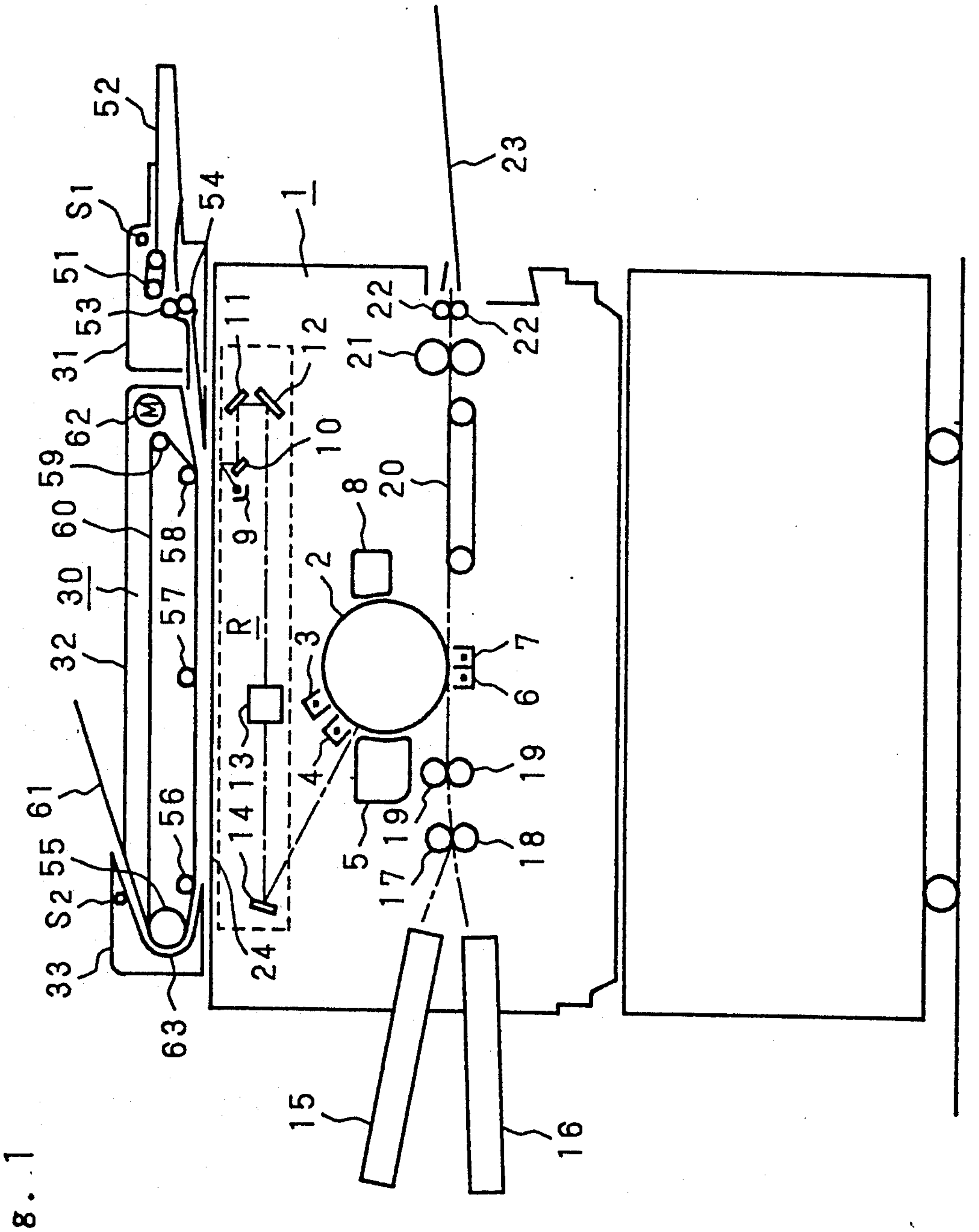
FIG. 1 is a sectional view illustrating the configuration of a copying apparatus of the invention.

In FIG. 1 illustrating the configuration of a copying apparatus according to the invention, an automatic document feeder (hereinafter, abbreviated as "ADF") 30 is provided on the upper surface of the main body 1 of the copying apparatus in such a manner that the ADF 30 can be opened with respect to a platen glass 24. The ADF 30 is composed of a document feeding unit 31, a document transporting unit 32, and a document discharging unit 33. The document feeding unit 31 consists of a document feed tray 52 on which documents are placed, a document feed roller 51, and resist rollers 53 and 54. The document feed roller 51 is supplied with a driving force which is transmitted through a driving force transmission mechanism (not shown), and the ON/OFF (activation/deactivation) operation of the roller 51 is performed by a clutch. The resist rollers 53 and 54 are disposed in the downstream of the document feed roller 51 along the feeding direction, and temporarily stop a document fed by the document feed roller 51, and then the activation/deactivation operation of the rollers 53 and 54 is performed by a clutch to transmit a driving force through a driving force transmission mechanism (not shown), thereby feeding out a document. In the vicinity of the document feed roller 51, a document presence detecting sensor S1 is disposed to detect the presence of a document on the document feed tray 52. The document transporting unit 32 consists of a document conveyor belt 60 extended between rollers 55 and 59, and press rollers 56, 57 and 58 which are disposed inside the document conveyor belt 60 and function to make the document conveyor belt 60 contact with the platen glass 24. The document conveyor belt 60 is rotated by the roller 59 to which a driving force is transmitted from a motor 62 through a driving force transmission mechanism (not shown), and the activation/deactivation operation of the roller 59 is performed by a clutch. The document discharging unit 33 comprises a document discharge tray 61. A document discharge detecting sensor S2 is disposed at the downstream end of a U-shaped guide 63 along the document transporting direction. The sensor S2 detects the rear end of a document to stop the document transportation.

By pressing a print key 101, the driving force is transmitted from the driving force transmission mechanism (not shown) to rotate the document feed roller 51. The rotation of the document feed roller 51 causes documents placed on the document feed tray 52 with their image faces down to be fed one by one in a sequence beginning at the top one of the laminated documents. Then, a thus fed document is transported until it is pressed against a nip portion of the resist rollers 53 and 54 which are disposed in the downstream of the document feed roller 51 along the feeding direction and pressed against each other, to form a loop, and is stopped to correct the skew. After the correction of the skew is ended, the resist rollers 53 and 54 and document conveyor belt 60 are driven, and the document is sent by the resist rollers 53 and 54 into the space between the document conveyor belt 60 and the platen glass 24, and transported to the predetermined exposure location on the platen glass 24 by the document conveyor belt 60. Then, the driving operation is stopped. After the stop of the driving operation, the copy operation is conducted, and then the document conveyor belt 60 is driven again to discharge the document along the U-shaped guide 63 onto the document discharge tray 61 which is disposed on the top face of the ADF 30.

The configuration of the main body 1 of the copying apparatus will be described.

At the substantially center portion of the main body 1 of the copying apparatus, disposed is a photosensitive drum 2 which can be rotated counterclockwise. At the surrounding of the photosensitive drum 2, an eraser lamp 3, an electrostatic charger 4, a development device 5, a transfer charger 6, a separation charger 7 for a sheet, and a blade type cleaning device 8 are arranged in sequence. An optical system R is provided under the platen glass 24 in such a manner that it can optically scan an image of a document, and consists of a light source 9, a first mirror 10, a second mirror 11, a third mirror 12, a projection lens 13 and a fourth mirror 14. In the main body 1 of the copying apparatus, a trouble detection sensor S3 which is not shown and detects troubles such as a jam and others is incorporated. At the left side of the main body 1 in the figure, automatic sheet supply cassettes 15 and 16 are disposed.

When the copy operation is started, the photosensitive drum 2 is uniformly charged by the electrostatic charger 4, and then the beam reflected from the document scanned by the optical system R is projected in a slit manner onto the drum 2 to form a latent image on its surface. This latent image is changed to a toner image by the development device 5. On the other hand, a sheet is supplied from either of the automatic sheet supply cassettes 15 and 16, and transported through a pair of transporting rollers 17 and 18 to a pair of timing rollers 19, and temporarily stopped in order to synchronize with the forward end of the toner image. Then, the sheet is transported again, and the toner image is transferred from the surface of the photosensitive drum 2 to the sheet by the corona discharge caused by the transfer charger 6. After the sheet is separated from the photosensitive drum 2 by the separation charger 7, the sheet is further transported by a conveyor belt 20 toward the right in the figure. The toner image is melted and fixed to the sheet by a heat fixing device 21, and thereafter the sheet is passed through a pair of discharge rollers 22 to be discharged onto a tray 23 which is at the right side of the figure and outside the main body 1 of the copying apparatus.

Figure 2:
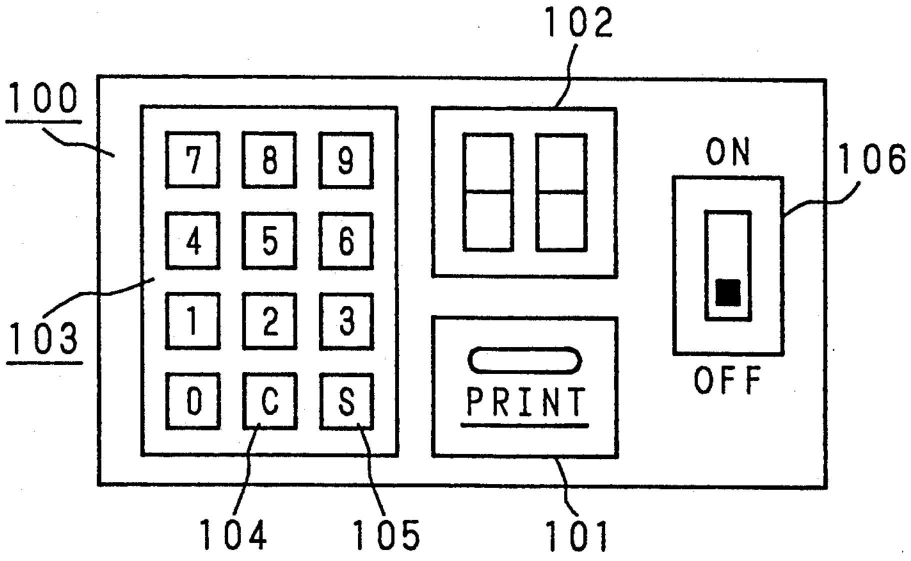
FIG. 2 is a plan view of an operation panel provided to the main body of the copying apparatus of the invention.

FIG. 2 is a plan view of an operation panel 100 provided on the main body 1 of the copying apparatus. The operation panel 100 comprises the print key 101 for instructing the start of the copy operation, a ten keys 103 for inputting the number of sheets to be copied, a 7-segment LED 102 for displaying the number of sheets to be copied, a clear key 104 for setting the copy conditions of the copying apparatus to the standard state, a stop key 105 for instructing the stop of the copy operation, and a dip switch 106 for setting the rotation direction of the document feed roller 51.

Figure 3:
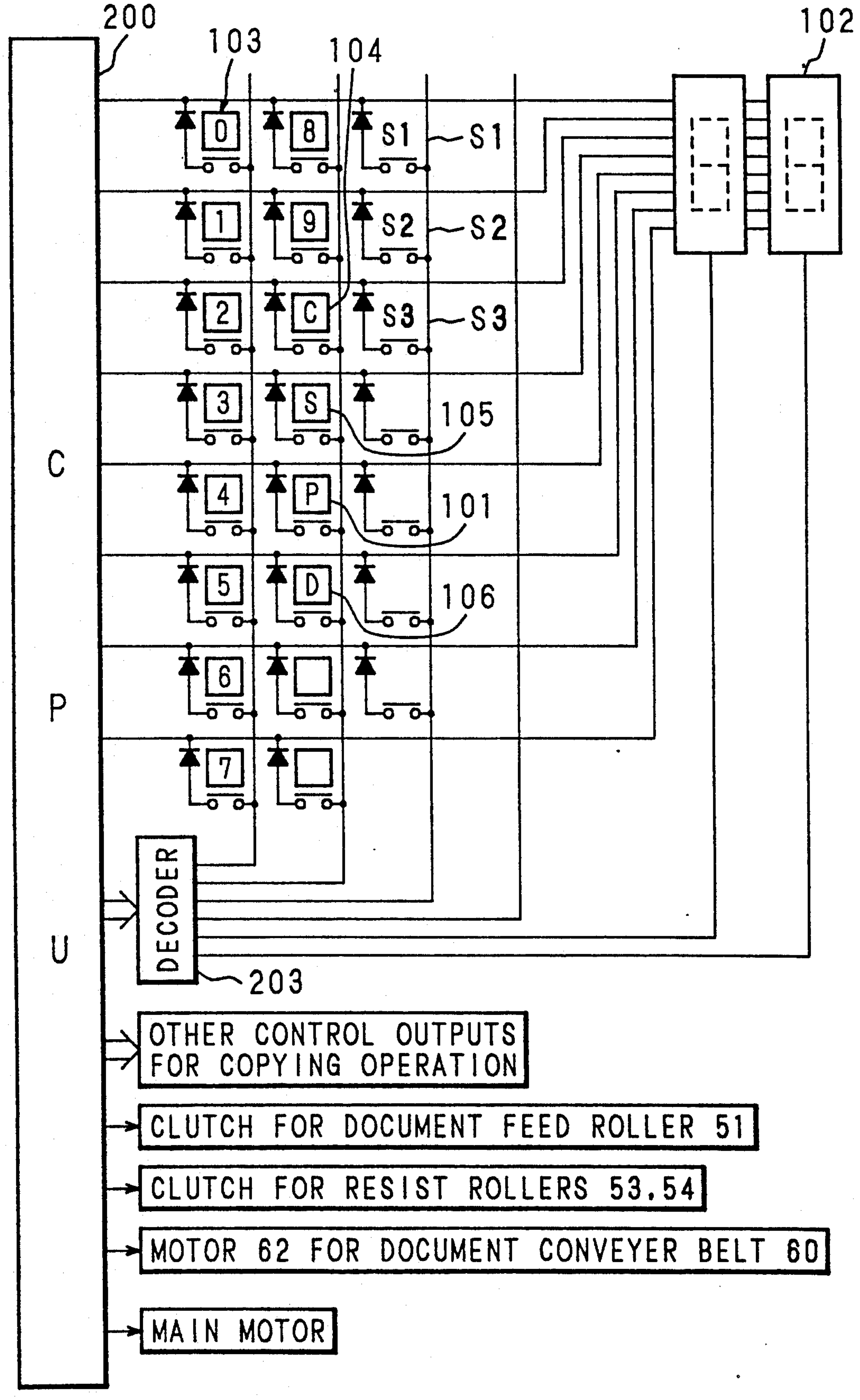
FIG. 3 is a block diagram illustrating the configuration of a control circuit of the copying apparatus of the invention.

FIG. 3 is a block diagram illustrating the configuration of a control circuit of the main body 1 of the copying apparatus.

The control circuit comprises a CPU 200 as the main component. The CPU 200 is connected via a decoder 203 with the ten keys 103, clear key 104, stop key 105, print key 101, 7-segment LED 102 and dip switch 106 which are on the operation panel 100, the document presence detecting sensor S1, the document discharge detecting sensor S2, and the trouble detection sensor S3. Furthermore, the CPU 200 is connected also with other components of the ADF 30, namely, the clutch for the document feed roller 51, the clutch for the resist rollers 53 and 54, and the motor 62 for the document conveyor belt 60.

The control procedure of the copy operation conducted by the control circuit will be described with reference to flow charts of FIGS. 4 and 5.

Before the description of the flow charts, the terms "on edge" and "off edge" will be defined. When the states of a switch, sensor, signals and so on change from the off state to the on state, this change of state will be defined as on edge. When the states of a switch, sensor, signals and so on change from the on state to the off state, this change of state will be defined as off edge.

Figure 4:
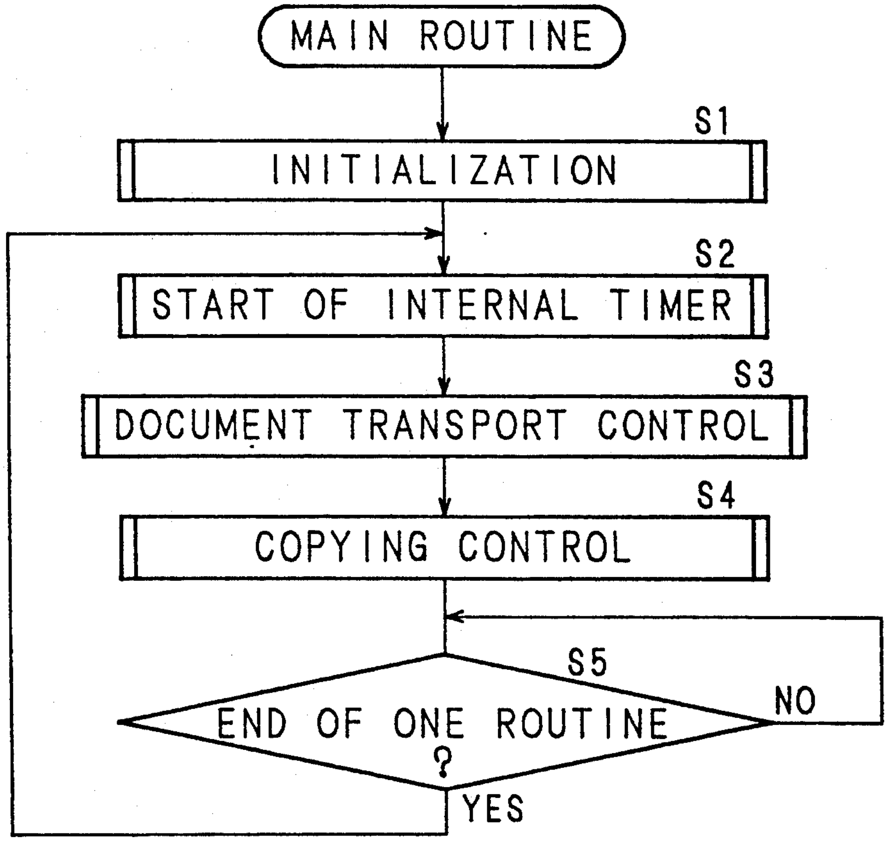
FIG. 4 is a flow chart illustrating the operation of the whole of the copying apparatus of the invention.

FIG. 4 illustrates the main routine of the CPU 200.

When a power source switch is turned on, the system is initialized in STEP 1. In this embodiment, the initialization means a process of setting all of the copying conditions to the standard state (e.g., the display of the 7-segment LED 102 for displaying the number of sheets to be copied is changed to "1"), and that of clearing a RAM, registers or the like in the CPU 200.

In STEP 2, an internal timer is started, and the main routine is executed at an interval of a preset period of time.

STEP 3 is a subroutine for executing the document transport control of the ADF 30, and is illustrated with reference to FIG. 5.

STEP 4 is a copy operation subroutine for activating the elements in the copying apparatus to execute the copy operation.

In STEP 5, it is determined whether or not the count operation of the internal timer is ended, and if ended the process returns to STEP 2.

Figure 5A:
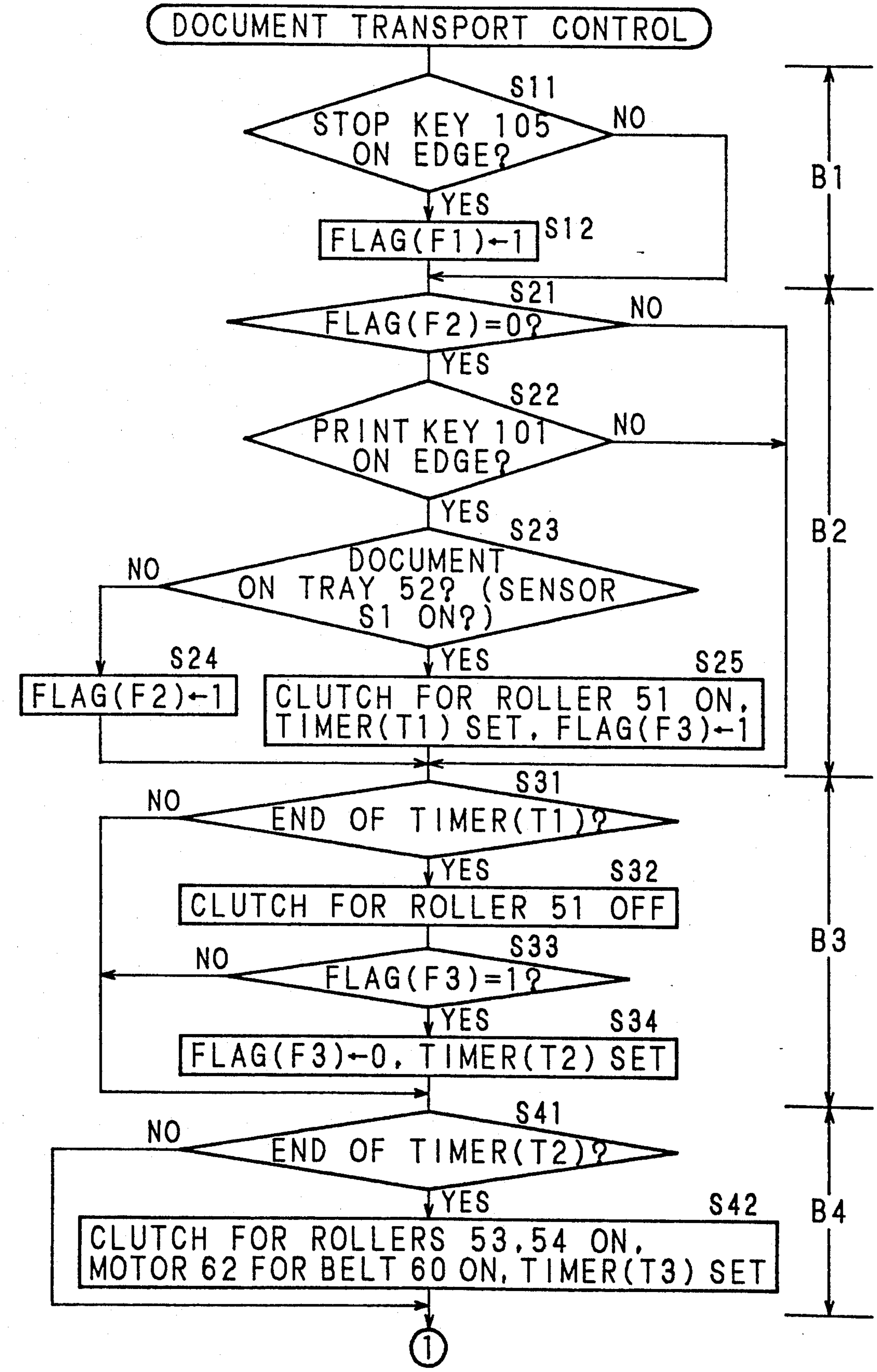
FIGS. 5(*a*)–5(*c*) is a flow chart illustrating an example of the document transporting operation of the copying apparatus of the invention.
Figure 5B:
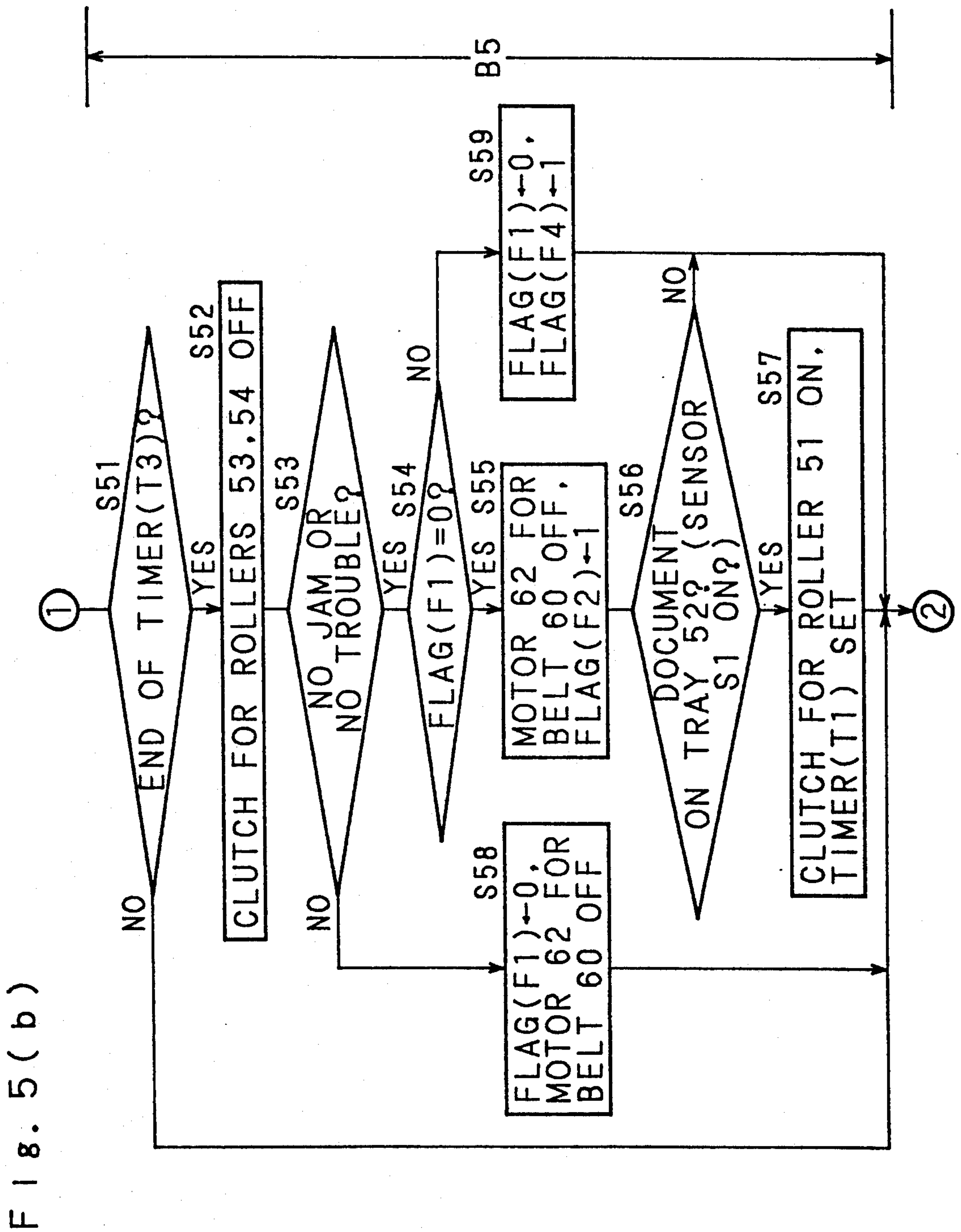
Figure 5C:
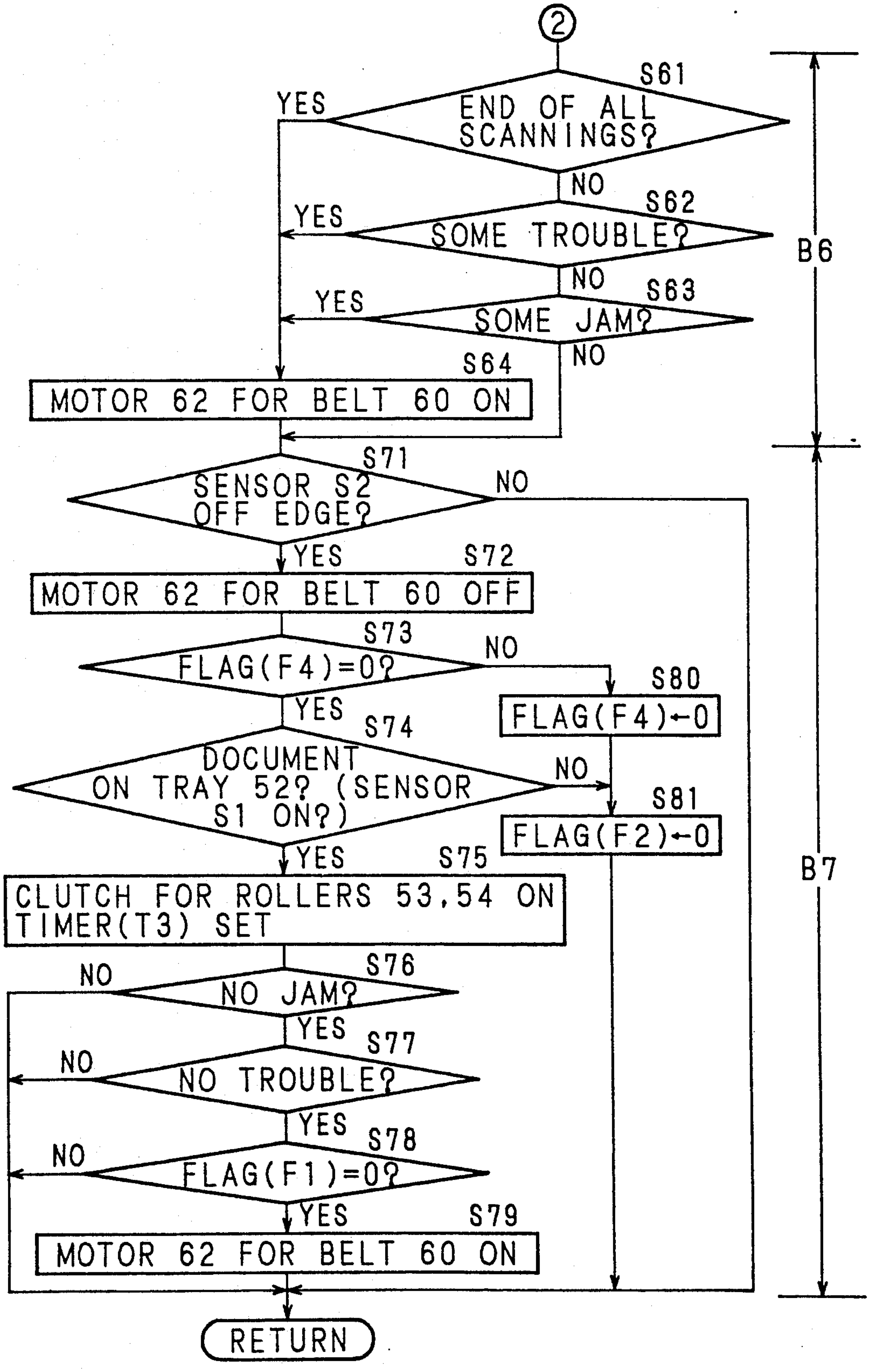
Figure 6A:
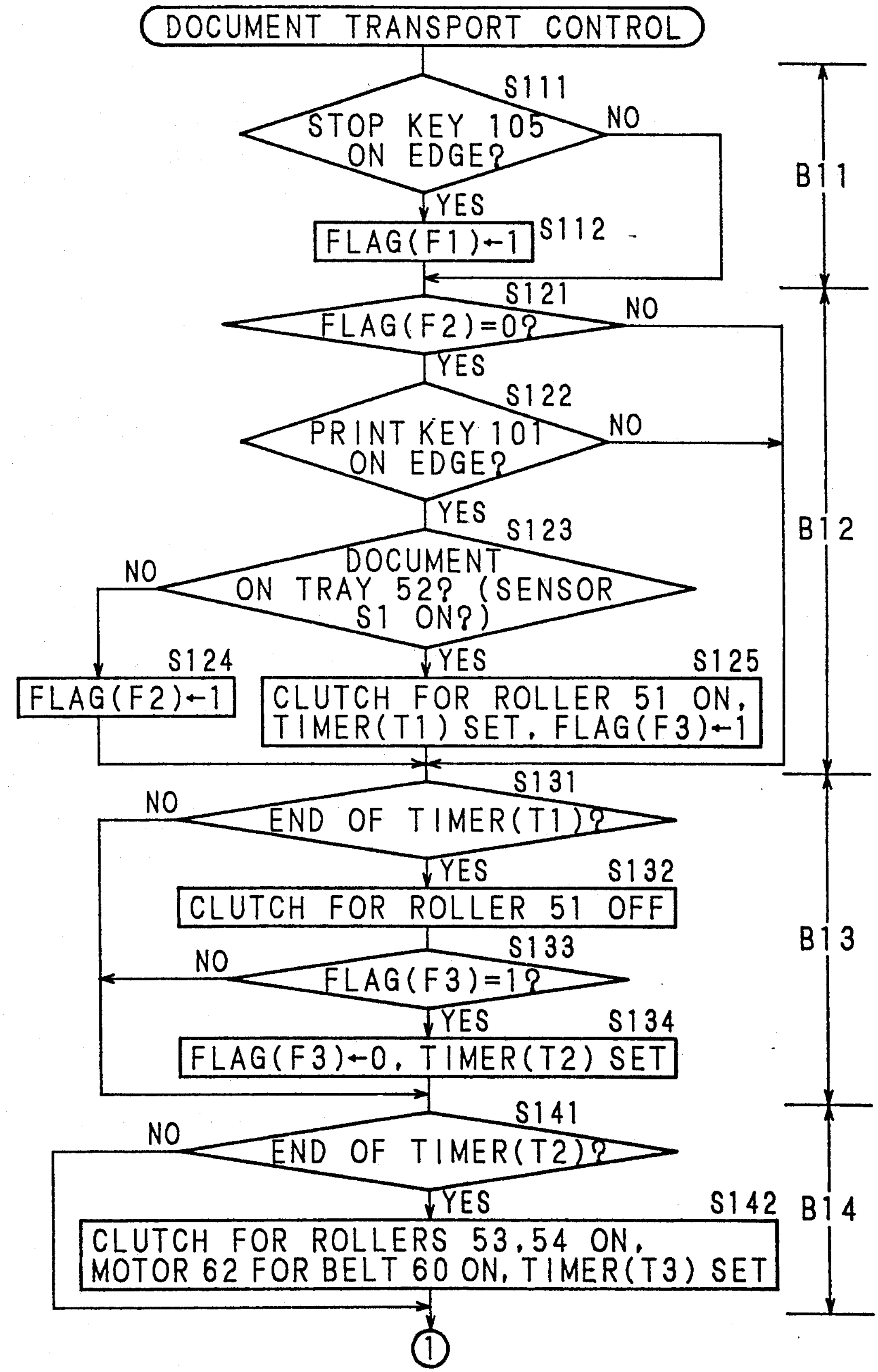
FIGS. 6(*a*)–6(*d*) is a flow chart illustrating another example of the document transporting operation of the copying apparatus of the invention.
Figure 6B:
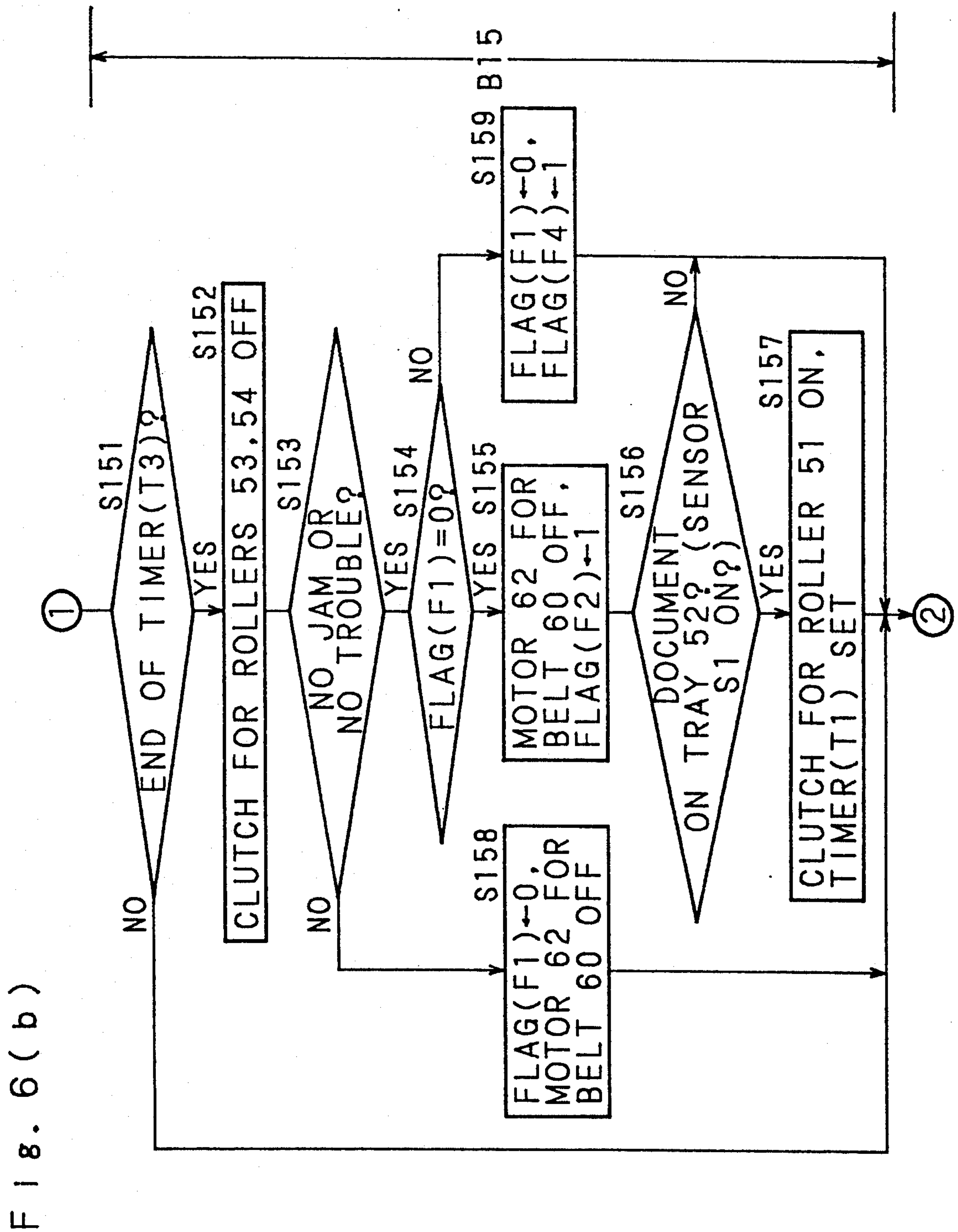
Figure 6C:
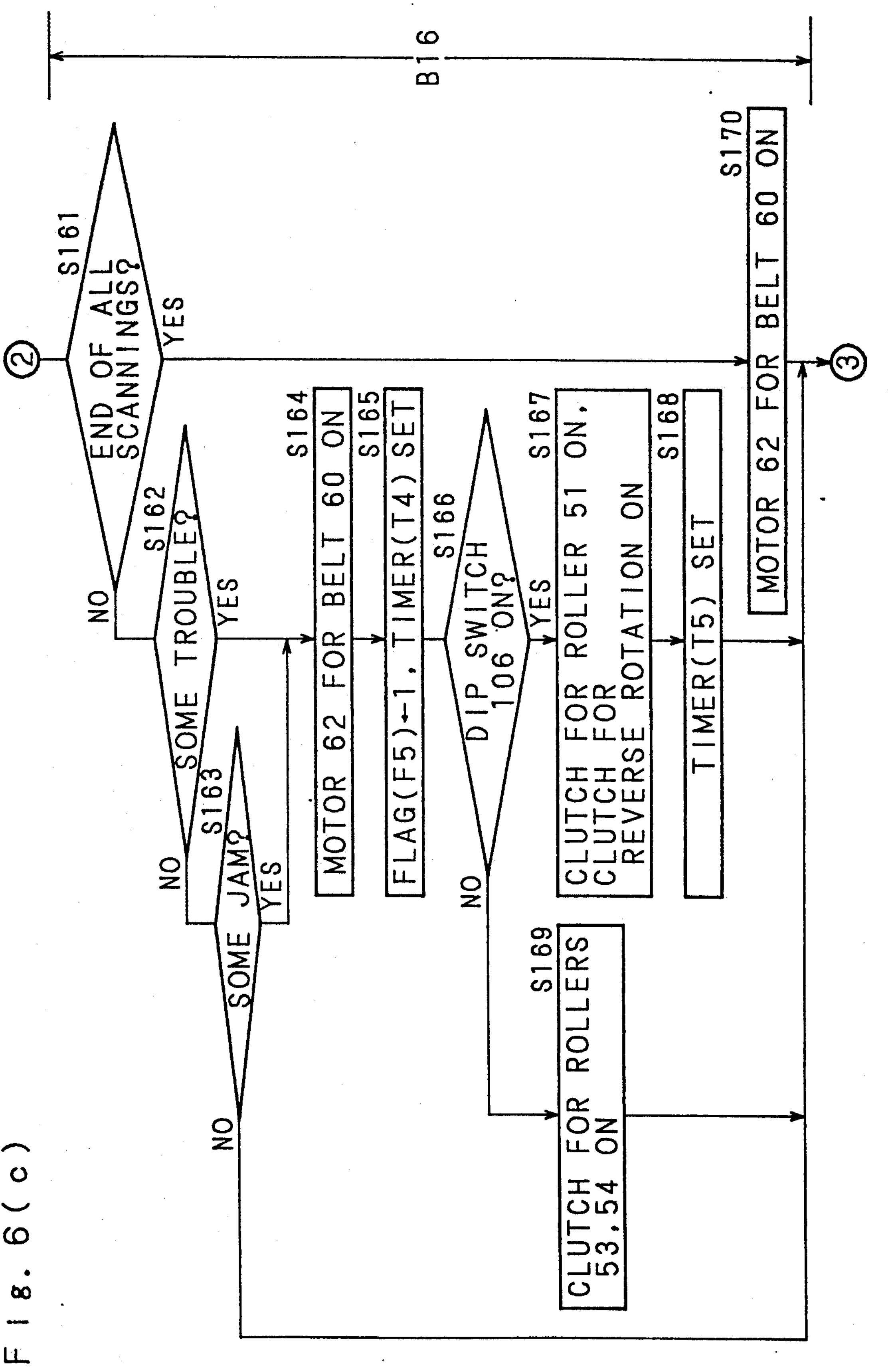
Figure 6D:
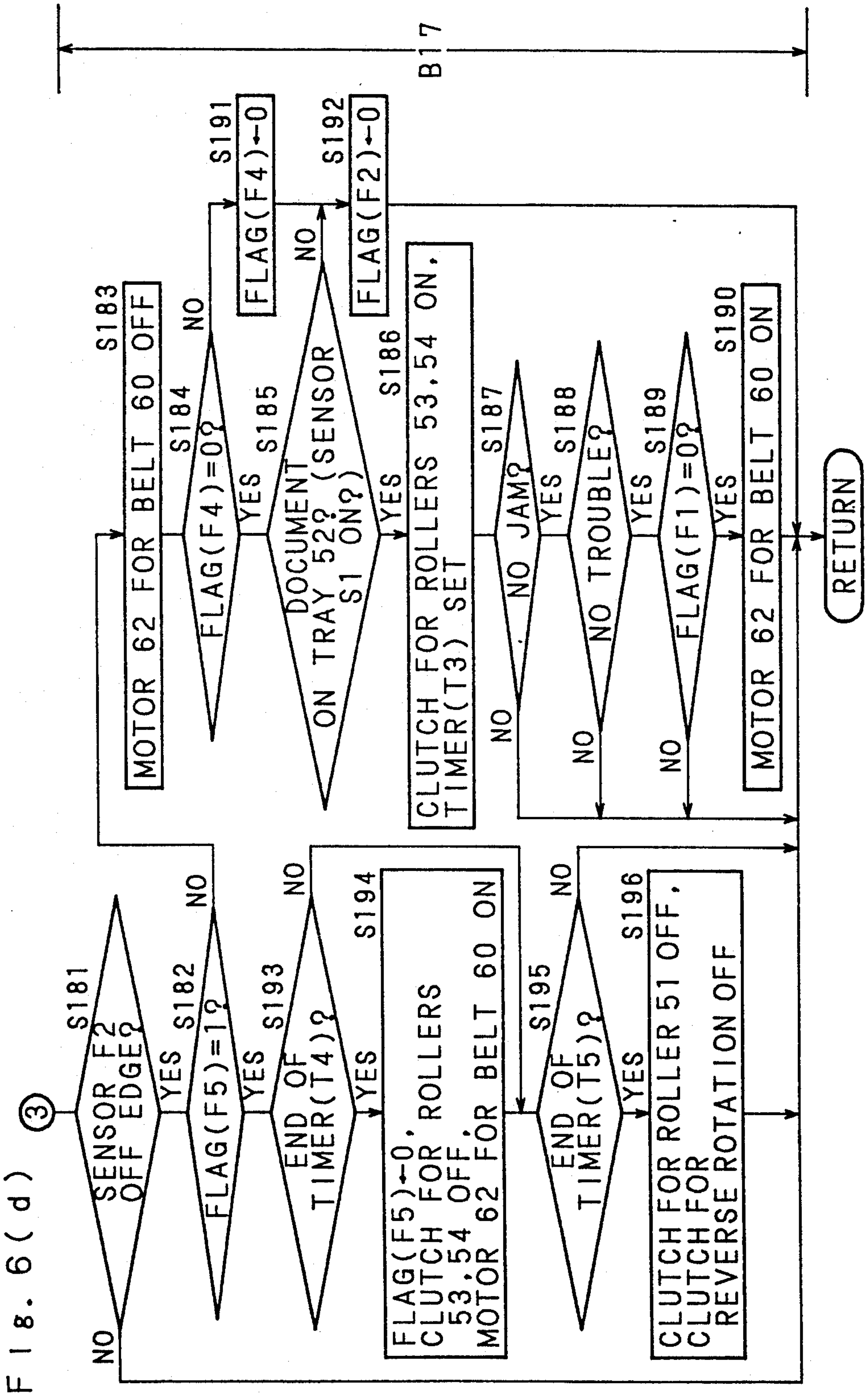

FIG. 5 is a flow chart illustrating the control of the document transporting operation. The control of the document transporting operation will be described with dividing it into seven blocks. Hereinafter, these blocks are respectively designated by blocks B1 to B7.

In block B1 which is a block for processing the stop key entry, at first, it is determined whether or not the stop key 105 is pressed (STEP 11). If the stop key 105 is pressed, a stop key flag F1 is set to "1" (STEP 12). If the stop key 105 is not pressed, the process proceeds to block B2.

Block B2 is a block for processing the print key entry. Firstly, it is determined in STEP 21 whether or not the main body 1 of the copying apparatus is in the copy operation. If the main body 1 is in the copy operation, the process jumps to block B3. If the main body 1 is not in the copy operation, it is determined whether or not the print key 101 is pressed (STEP 22). If the print key 101 is pressed, it is determined by the document presence detecting sensor S1 whether or not a document exists on the document feed tray 52 of the ADF 30 (STEP 23). If the print key 101 is not pressed, the process jumps to block B3 without executing any processing. If it is determined in STEP 23 that a document exists on the tray 52, the clutch for the document feed roller 51 is activated to rotate the document feed roller 51, thereby feeding the document toward the document transporting unit 32. At the same time, a timer T1 is set, and a copy operation start flag F3 is set to "1" (STEP 25). The set time period of the timer T1 is selected so as to be slightly longer than the time period required for the forward end of the document to move the position on the document feed tray 52 to the resist rollers 53 and 54, so that the document forms a loop at a position before the resist rollers 53 and 54. In contrast, if it is determined in STEP 23 that no document exists on the tray 52, a flag F2 indicating that the main body is in the copy operation is set to "1" (STEP 24). This processing is conducted because there is a case where a document is manually placed on the platen glass 24 without using the ADF 30.

Block B3 is a block for processing the prefeed of a document. In STEP 31, it is determined whether or not the document fed by the document feed roller 51 has reached the resist roller 53 and 54. When the count operation of the timer T1 is ended, the clutch for the document feed roller 51 is deactivated to stop the rotation of the document feed roller 51 (STEP 32). In this case, the document fed by the document feed roller 51 is pressed against the nip portion of the resist roller 53 and 54, and then further advanced by the document feed roller 51 so as to form a loop at a position before the resist rollers 53 and 54, and stopped. If the count operation of the timer T1 is not ended, the process jumps to block B4 without executing any processing. Next, it is determined whether or not the copy operation start flag F3 is set (STEP 33). If it is set, the copy operation start flag F3 is reset, and at the same time a timer T2 for counting the time period required for surely stopping the forward end of the document at the nip portion of the resist rollers 53 and 54 after the document feed roller 51 is stopped is set (STEP 34). If the copy operation start flag F3 is not set, the process jumps to block B4.

In block B4, the process of inserting a prefed document is conducted. It is determined in STEP 41 whether or not the count operation of the timer T2 is ended. If it is ended, the clutch for the resist rollers 53 and 54 and the motor 62 for the document conveyer belt 60 are activated to start the operation of transporting the document toward the predetermined exposure location on the platen glass 24, and a timer T3 for counting a time period required for the document to move from the resist rollers 53 and 54 to the predetermined exposure location on the platen glass 24 is set (STEP 42). If the count operation of the timer T2 is not ended, the processor jumps to block B5 without executing any processing.

Block B5 is a block for starting the copy operation. It is determined in STEP 51 whether or not the count operation of the timer T3 is ended. If it is ended, it is determined that the document has reached the predetermined exposure location on the platen glass 24, and the clutch for the resist rollers 53 and 54 is deactivated to stop the rotation of the rollers 53 and 54 (STEP 52). Then, it is determined whether or not a jam or a trouble of the optical system R, the development device 5, etc. is caused in the main body 1 of the copying apparatus occurs (STEP 53). If there is a jam or trouble, the stop key flag F1 is reset and the motor 62 for the document conveyer belt 60 is deactivated (STEP 58), and the process jumps to block B6. If there is not a jam or trouble, it is determined whether or not the stop key flag F1 is reset (STEP 54)). If the stop key flag F1 is not reset, it is reset, and an end flag F4 for judging whether or not the copy operation is ended is set (STEP 59), and the process advances to block B6. If the stop key flag F1 is reset, the motor 62 for the document conveyer belt 60 is deactivated and the copy operation flag F2 is set (STEP 55). Then, it is determined by the document presence detecting sensor S1 whether or not the next document exists on the document feed tray 52 (STEP 56). If the next document exists on the document feed tray 52, the clutch for the document feed roller 51 is activated to rotate the document feed roller 51 and the timer T1 is set (STEP 57). If no document exists on the document feed tray 52, the process jumps to block B6. If the count operation of the timer T3 is not ended in STEP 51, the process jumps to block B6.

Block B6 is a block for processing the exchange of documents. At first, it is determined whether or not a preset number of the operations of scanning the document on the platen glass 24 have been conducted (STEP 61). If the scanning operations have been finished, the motor 62 for the document conveyer belt 60 is activated to discharge the document (STEP 64). If the scanning operations have not been finished, it is determined whether or not a jam or trouble occurs (STEPs 62 and 63). If a jam or trouble occurs, the process proceeds to STEP 64 in which the motor 62 for the document conveyer belt 60 is activated, and, if a jam or trouble is not happened, the process proceeds to block B7.

Block B7 is a block for processing the insertion of the next document. In STEP 71, it is determined whether or not the document is discharged, by detecting the off edge of the document discharge detecting sensor S2. If the document is discharged, the motor 62 for the document conveyer belt 60 is deactivated (STEP 72), and it is judged whether or not the end flag F4 is reset (STEP 73). If the flag F4 is reset, it is determined whether or not the next document exists on the document feed tray 52 of the ADF 30 (STEP 74). If it is determined that the next document exists, the clutch for the resist rollers 53 and 54 is activated to rotate the resist rollers 53 and 54, and the timer T3 for counting a time period required for the next end of the document to move from the nip portion of the resist rollers 53 and 54 to the predetermined exposure location on the platen glass 24 is set (STEP 75). Then, it is determined whether or not a jam or trouble is happened or the stop key flag F1 is set (STEPs 76, 77 and 78). If a jam or trouble is not happened and the stop flag F1 is not set, the motor 62 for the document conveyer belt 60 is activated (STEP 79). In contrast, if a jam or trouble occurs or the stop key flag F1 is set, the process returns to the main routine.

If the end flag F4 is not reset in STEP 73, the end flag F4 is reset (STEP 80), the copy operation flag F2 is set (STEP 81), and the process returns to the main routine. If the next document does not exist on the document feed tray 52 of the ADF 30 in STEP 74, the copy operation flag F2 is reset (STEP 81), and the process returns to the main routine. If the document is not discharged in STEP 71, the process returns to the main routine.

In this embodiment, when a trouble such as a jam occurs in the main body of the copying apparatus, the document on the platen glass 24 is discharged onto the document discharge tray 61, and the prefed document is transported onto the platen glass 24. Alternatively, both the document on the platen glass 24 and the prefed one may be discharged onto the document discharge tray 61.

Another embodiment of the control of transporting documents will be described. In this embodiment, when a trouble such as a jam occurs in the main body 1 of the copying apparatus, the prefed document is immediately transported to the document discharge tray 61 (or the platen glass 24) or to the document feed tray 52. The direction of transporting the prefed document can be changed by the dip switch 106 on the operation panel 100.

FIG. 6 is a flow chart illustrating the control of transporting documents of this embodiment. The control of transporting documents will be described with dividing it into seven blocks. Hereinafter, these blocks are respectively designated by blocks B11 to B17.

In block B11 which is a block for processing the stop key entry, at first, it is determined whether or not the stop key 105 is pressed (STEP 111). If the stop key 105 is pressed, the stop key flag F1 is set to "1" (STEP 112). If the stop key 105 is not pressed, the process proceeds to block B12.

Block B12 is a block for processing the print key entry. Firstly, it is determined in STEP 121 whether or not the main body 1 of the copying apparatus is in the copy operation. If the main body 1 is in the copy operation, the process jumps to block B13. If the main body 1 is not in the copy operation, it is determined whether or not the print key 101 is pressed (STEP 122). If the print key 101 is pressed, it is determined by the document presence detecting sensor S1 whether or not a document exists on the document feed tray 52 of the ADF 30 (STEP 123). If the print key 101 is not pressed, the process jumps to block B13 without executing any processing. If it is determined in STEP 123 that a document exists on the tray 52, the clutch for the document feed roller 51 is activated to rotate the document feed roller 51, thereby feeding the document toward the document transporting unit 32. At the same time, the timer T1 is set, and the copy operation start flag F3 is set to "1" (STEP 125). The set time period of the timer T1 is selected so as to be slightly longer than the time period required for the forward end of the document to move the position on the document feed tray 52 to the resist rollers 53 and 54, so that the document forms a loop at a position before the resist rollers 53 and 54. In contrast, if it is determined in STEP 123 that no document exists on the tray 52, the copy operation flag F2 is set to "1" (STEP 124). This processing is conducted because there is a case where a document is manually placed on the platen glass 24 without using the ADF 30.

Block B13 is a block for processing the prefeed of a document. In STEP 131, it is determined whether or not the document fed by the document feed roller 51 has reached the resist rollers 53 and 54. When the count operation of the timer T1 is ended, the clutch for the document feed roller 51 is deactivated to stop the rotation of the document feed roller 51 (STEP 132). In this case, the document fed by the document feed roller 51 is pressed against the nip portion of the resist rollers 53 and 54, and then further fed by the document feed roller 51 so as to form a loop at a position before the resist rollers 53 and 54, and stopped. If the count operation of the timer T1 is not ended, the process jumps to block B14 without executing any processing. Next, it is determined whether or not the copy operation start flag F3 is set (STEP 133). If it is set, the copy operation start flag F3 is reset, and at the same time the timer T2 for counting the time period required for surely stopping the forward end of the document at the nip portion of the resist rollers 53 and 54 after the document feed roller 51 is stopped is set (STEP 134). If the copy operation start flag F3 is not set, the process jumps to block B14.

In block B14, the process of inserting a prefed document is conducted. It is determined in STEP 141 whether or not the count operation of the timer T2 is ended. If it is ended, the clutch for the resist rollers 53 and 54 and the motor 62 for the document conveyer belt 60 are activated to start the operation of transporting the document toward the predetermined exposure location on the platen glass 24, and the timer T3 for counting a time period required for the document to move from the resist rollers 53 and 54 to the predetermined exposure location on the platen glass 24 is set (STEP 142). If the count operation of the timer T2 is not ended, the process jumps to block B15 without executing any processing.

Block B15 is a block for starting the copy operation. It is determined in STEP 151 whether or not the count operation of the timer T3 is ended. If it is ended, it is determined that the document has reached the predetermined exposure location on the platen glass 24, and the clutch for the resist rollers 53 and 54 is deactivated to stop the rotation of the rollers 53 and 54 (STEP 152). Then, it is determined whether or not a jam or a trouble of the optical system R, the development device 5, etc. is caused in the main body 1 of the copying apparatus occurs (STEP 153). If there is a jam or trouble, the stop key flag F1 is reset and the motor 62 for the document conveyer belt 60 is deactivated (STEP 158), and the process jumps to block B16. If there is not a jam or trouble, it is determined whether or not the stop key flag F1 is reset (STEP 154). If the stop key flag F1 is not reset, it is reset, and the end flag F4 for judging whether or not the copy operation is ended is set (STEP 159), and the process advances to block B16. If the stop key flag F1 is reset, the motor 62 for the document conveyor belt 60 is deactivated and the copy operation flag F2 is set (STEP 155). Then, it is determined by the document presence detecting sensor S1 whether or not the next document exists on the document feed tray 52 (STEP 156). If the next document exists on the document feed tray 52, the clutch for the document feed roller 51 is activated to rotate the document feed roller 51 and the timer T1 is set (STEP 157). If no document exists on the document feed tray 52, the process jumps to block B16. If the count operation of the timer T3 is not ended in STEP 151, the process jumps to block B16.

Block B16 is a block for processing the exchange of documents. At first, it is determined whether or not a preset number of the operations of scanning the document on the platen glass 24 have been conducted (STEP 161). If the scanning operations have been finished, the motor 62 for the document conveyer belt 60 is activated to discharge the document (STEP 170). If the scanning operations have not been finished, it is determined whether or not a jam or trouble occurs (STEPs 162 and 163). If a jam or trouble occurs, the motor 62 for the document conveyer belt 60 is activated (STEP 164), and, if neither of a jam and trouble occurs, the process jumps to block B17. A discharge flag F5 indicating that the operation of discharging a document is started is set, and a timer T4 is set (STEP 165). The set time period of the timer T4 is selected so as to be the time period required for both the document on the platen glass 24 and that prefed by the document feed roller 51 to be discharged. Alternatively, the set time period of the timer T4 may be selected so as to be the time period required for the loop state of the document prefed by the document feed roller 51 to be canceled. It is determined whether or not the dip switch 106 on the operation panel 100 by which the rotation direction (forward or reverse direction) of the document feed roller 51 is set is in the on state (STEP 166). If the dip switch 106 is not in the on state (STEP 166: NO), the process proceeds to STEP 169 in which the clutch for the resist rollers 53 and 54 is activated, and then to block B17. If the dip switch 106 is in the on state (STEP 166: YES), the process proceeds to STEP 167 in which a clutch for reversely rotating the document feed roller 51 is activated, and a timer T5 is set in STEP 168, and the process then advances to block B17. The set time period of the timer T5 is selected so as to be the time period required for reversely rotating the document feed roller 51 in order to cancel the loop state of the document which has been prefed by the document feed roller 51.

Block B17 is a block for processing the insertion of the next document. In STEP 181, it is determined whether or not the document is discharged, by detecting the off edge of the document discharge detecting sensor S2. If the document is discharged, it is determined whether or not the discharge flag F5 is set (STEP 182). If the discharge flag F5 is not set (STEP 182: NO), the motor 62 for the document conveyor belt 60 is deactivated (STEP 183), and it is judged whether or not the end flag F4 is reset (STEP 184). If the end flag F4 is reset, it is determined whether or not the next document exists on the document feed tray 52 of the ADF 30 (STEP 185). If it is determined that the next document exists, the clutch for the resist rollers 53 and 54 is activated to rotate the resist rollers 53 and 54, and the timer T3 for counting a time period required for the rear end of the document to move from the nip portion of the resist rollers 53 and 54 to the predetermined exposure location on the platen glass 24 is set (STEP 186). Then, it is determined whether or not a jam or trouble is happened or the stop key flag F1 is set (STEPs 187, 188 and 189). If a jam or trouble is not happened and the stop key flag F1 is not set, the motor 62 for the document conveyer belt 60 is activated (STEP 190). In contrast, if a jam or trouble occurs or the stop key flag F1 is set, the process returns to the main routine.

If the end flag F4 is not reset in STEP 184, the end flag F4 is reset (STEP 191), the copy operation flag F2 is reset (STEP 192), and the process returns to the main routine. If the next document does not exist on the document feed tray 52 of the ADF 30 in STEP 185, the copy operation flag F2 is reset (STEP 192), and the process returns to the main routine. If the discharge flag F5 is set in STEP 182, it is determined in STEP 193 that whether or not the count operation of the timer T4 is ended. If it is ended (STEP 193: YES), the discharge flag F5 is reset, and the clutch for the resist rollers 53 and 54 and the motor 62 for the document conveyer belt 60 are deactivated, and the process proceeds to STEP 195. If it is not ended (STEP 193: NO), the process jumps to STEP 195. In STEP 195, it is determined whether or not the count operation of the timer T5 is ended. If it is ended (STEP 195: YES), the process proceeds to STEP 196 in which the clutch for the document feed roller 51 and that for reversely rotating the document feed 51 are deactivated, and then returns to the main routine. If it is not ended (STEP 195: NO), the process returns to the main routine. If the document is not discharged in STEP 181, the process returns to the main routine.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus comprising:

document feeding and transporting means for feeding documents one by one from a document accommodating portion, and for transporting a fed document onto a platen, said document feeding and transporting means including a document stop member for stopping a fed document at a predetermined position before said platen;

first control means for controlling the operation of said document feeding and transporting means so as to transport a preceding document onto said platen, and to feed a succeeding document to said predetermined position;

image forming means for forming an image on a sheet, said image corresponding to a document on said platen;

instruction means for instructing the stop of the image forming operation of said image forming means; and second control means for, in response to the stop instruction from said instruction means, controlling the operation of said document feeding and transporting means so as to transport in a predetermined direction said succeeding document fed to said predetermined position.

2. An image forming apparatus according to claim 1, wherein said first control means controls the operation of said document feeding and transporting means so that a document forms a loop at said predetermined position, and said second control means controls the operation of said document feeding and transporting means at least portion said loop is broken.

3. An image forming apparatus comprising:

document feeding and transporting means for feeding documetns one by one from a doucment accommodating portion, and for transporting a fed document onto a platen, said document feeding and transporting means including a document stop member for stopping a fed document at a predetermined position before said platen, and a document discharge member for discharging a document on said platen to a document discharging portion;

first control means for controlling the operation of said document feeding and transporting means so as to transport a preceding document onto said platen, and to feed a succeeding document to said predetermined position;

image forming means for forming an image on a sheet, said image corresponding to a document on said platen;

instruction means for instructing the stop of the image forming operation of said image forming means; and second control means for, in response to the stop instruction from said instruction means, controlling the operation of said document feeding and transporting means so as to transport in a predetermined direction said succeeding document fed to said predetermined position.

4. An image forming apparatus according to claim 3, wherein said second control means controls the operation of said document feeding and transporting means so as to discharge said preceding document on said platen to said document discharging portion, and to transport said succeeding document fed to said predetermined position, onto said platen.

5. An image forming apparatus according to claim 3, wherein said second control means controls the operation of said document feeding and transporting means so as to discharge said preceding document on said platen and said succeeding document fed to said predetermined position, to said document discharging portion.

6. An image forming apparatus according to claim 3, wherein said second control means controls the operation of said document feeding and transporting means so as to discharge said preceding document on said platen to said document discharging portion, and to transport a document fed to said predetermined position, to said document accommodating portion.

7. An image forming apparatus comprising:

document feeding and transporting means for feeding documents one by one from a document accommodating portion, and for transporting a fed document onto a platen, said document feeding and transporting means including a transporting member, and a document stop member for stopping a fed and transported document at a predetermined position before said platen, the document transport direction of said transporting member being changeable;

first control means for controlling the operation of said document feeding and transporting means so as to transport a preceding document onto said platen, and to feed a succeeding document to said predetermined position;

image forming means for forming an image on a sheet, said image corresponding to a document on said platen;

instruction means for instructing the stop of the image forming operation of said image forming means; and second control means for, in response to the stop instruction from said instruction means, controlling the operation of said document feeding and transporting means so as to transport said succeeding document fed to said predetermined position to a selected transport direction.

8. An image forming apparatus according to claim 7, further comprising designating means for, in a case that said instruction means outputs the stop instruction, designating a transport direction of said succeeding document fed to said predetermined position.

9. An image forming apparatus according to claim 7, wherein said second control means controls the operation of said document feeding and transporting means so as to discharge said preceding document on said platen to a document discharging portion, and to transport said succeeding document fed to said predetermined position, toward said platen.

10. An image forming apparatus according to claim 7, wherein said second control means controls the operation of said document feeding and transporting means so as to discharge said preceding document on said platen to a document discharging portion, and to transport said succeeding document fed to said predetermined position, toward said document accommodating unit.

11. An image forming apparatus according to claim 7, wherein said first control means controls the operation of said document feeding and transporting means so that a document forms a loop at said predetermined position.

* * * * *

UNITED STATES PATENT AND TRADEMARK OFFICE

CERTIFICATE OF CORRECTION

PATENT NO. : 5,225,868

DATED : July 6, 1993

INVENTOR(S) : Syuzi Maruta

It is certified that error appears in the above-indentified patent and that said Letters Patent is hereby corrected as shown below:

In Col. 6, lines 20 and 21, change "processor" to --process--.

In Col. 7, line 12, change "next" to --rear--.

In Col. 7, line 18, after "stop", insert --key--.

In Col. 11, line 16 (Claim 3, line 3), change "documetns" to --documents--; and change "doucment" to --document--.

Signed and Sealed this

Twenty-second Day of March, 1994

Attest:

BRUCE LEHMAN

*Attesting Officer* *Commissioner of Patents and Trademarks*